May 7, 1957
T. R. LINGG
2,791,374
WASTE HANDLING DEVICE
Filed July 22, 1955
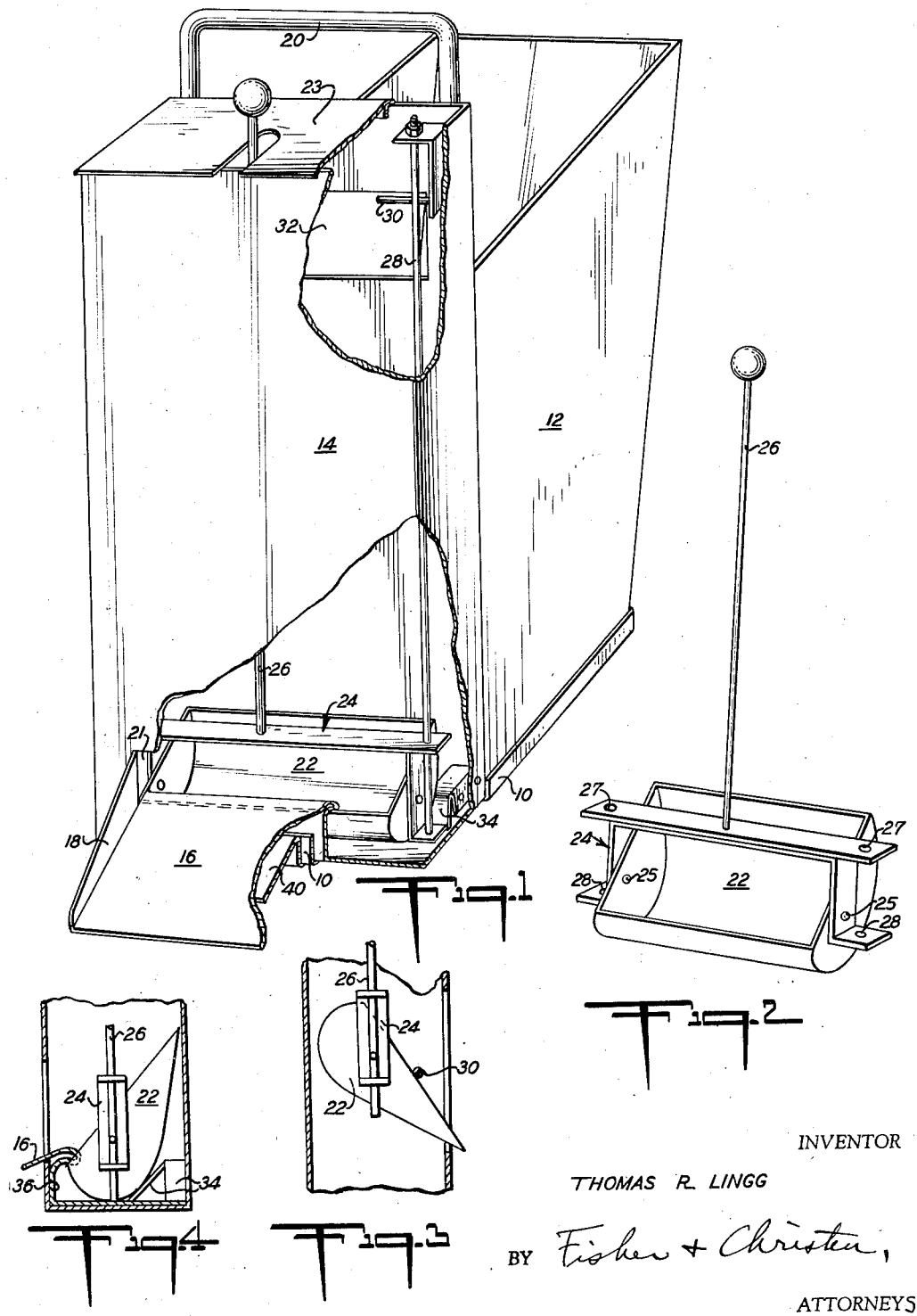
INVENTOR
THOMAS R. LINGG
BY Fisher + Christen,
ATTORNEYS

2,791,374

WASTE HANDLING DEVICE

Thomas Russell Lingg, Harrisburg, Pa.

Application July 22, 1955, Serial No. 523,895

4 Claims. (Cl. 232—43.3)

The present invention relates to a waste handling device for collecting and storing floor sweepings and the like.

One object of this invention is the provision of waste collecting means enabling one to remove accumulated dirt from the floor without stooping or squatting. Another object of the invention is the provision of a manually operable dirt lifting device in an easily transported combined waste receptacle and dust pan. Other objects of the invention will be obvious from the following description and the accompanying drawing.

The objects of the invention are accomplished generally by a manually transportable waste handling device comprising a base, a receptacle detachably mounted on the base, a dirt collecting chute or dust pan fixed on the base, and means for moving dirt from the collecting chute to the receptacle. More specifically, the objects of this invention are accomplished by a waste handling device comprising a base, a storage receptacle detachably mounted on one end of the base, a collecting chute fixed on the other end of the base, a dirt elevator housing fixed on the base between the chute and the receptacle and a dirt carrier positioned in said housing and adapted to be manually moved in a vertical plane from a dirt receiving position adjacent said chute to a dirt dumping position above the receptacle. In the preferred construction, the dirt carrier is pivotally mounted in a bracket which slides up and down on guide posts provided in the housing and abutment means within the housing are provided for tilting the carrier to dirt receiving and dirt dumping positions.

The invention will be better understood by reference to the attached drawing in which Fig. 1 is a perspective view of the preferred embodiment of the invention with parts of the elevator housing and collecting chute broken away to show the construction of the various operating elements, Fig. 2 is a perspective view of the dirt carrier mounted in its bracket and removed from its housing, and Figs. 3 and 4 are diagrammatic sketches illustrating the operation of the invention.

In the preferred embodiment of this invention illustrated in the drawings, a base 10 made of angle aluminum formed into a rectangle, detachably supports a rectangular waste receptacle at one end thereof and fixedly supports a waste collecting chute 16 at its other end. A dirt elevator housing 14 is fixed on the base 10 between the receptacle or waste can and the chute or dust pan.

The detachable waste receptacle is simply a storage device and its size, shape and construction are immaterial to the successful operation of the invention. The base may assume any of a wide variety of forms to cooperate with the receptacle chosen without departing from the scope of the invention. However, the relationship between the elevator housing and the receptacle is important, as the dirt must be raised in the housing above the level at which an opening is provided in the receptacle. Thus, if an open top receptacle is used, the housing will be substantially taller than the waste receptacle. On the other hand, if a closed receptacle is used in which an opening is provided for cooperative action with a mating opening in the housing, the storage receptacle may stand above the elevator.

The collecting chute 16 is similar to the usual dust pan construction in that it includes a sloped planar member having a forward edge engaging floor and a pair of sides 18 to channel the dirt as it moves rearwardly up the slope. A reinforcing bottom plate 40 supports the chute 16 to hold it in proper relation to base 10, thereby assuring that the chute will not become warped or twisted whereby dust and sweepings might go under it instead of in it.

The housing 14 is provided with a handle 20 for manually transporting the entire device and a lid 23 for removal of the carrier and repair if required. The housing 14 is provided with a lower front dirt receiving opening 21 and a rear dumping opening 32 at the upper rear side above the level of the top of the receptacle.

The dirt elevator within the housing 14 includes a dirt carrier 22 pivotally mounted in a bracket indicated generally at 24 and an operating handle 26. A vertical guide post 28 is secured in each side of the housing. One post extends through holes 27 and 28 on one side of bracket 24 while the other extends through holes 27 and 28 on the other side of the bracket. Each of these holes is provided with a fiber bushing to enable the elevator to operate quietly. The dirt carrier 22 is mounted in bracket 24 by a pair of pivots 25. The carrier is shovel-shaped so that in the loading position of Fig. 4, it will retain a substantial amount of sweepings and in the dumping position of Fig. 3 its contents will be easily released.

A pin 30 is provided in each side of housing 14 for engaging the top of carrier 22 as it approaches its uppermost position and these pins serve as abutments for forcing the carrier 22 to dump. The rectangular opening 32 in the back of the housing extends just below the level of the waste receptacle 12 whereby the sweepings may be dumped out of the housing into the storage container. A stop or abutment 34 is positioned at each side of the bottom of the elevator housing for pivoting the dirt carrier into a dirt-sealed engagement with the rear of collecting trough 16. In this connection, it will be noted that the rear of the collecting chute is provided with an undercut portion 36 into which the back of the carrier 22 may be moved by abutment means 34. Stop 34 is made of a piece of spring steel mounted on a small piece of angle as this furnishes an urging force to the carrier rather than a positive motion.

In operation, one lifts the entire waste handling device by handle 20 and moves it to wherever dirt is to be collected. The dirt carrier normally will be held by the force of gravity in the loading position shown in Fig. 1 and Fig. 4. Dirt may then be swept up chute 16 into carrier 22. The operator then lifts handle 26 thereby lifting carrier 22 towards the position of Fig. 3. As the carrier approaches this position, the top of carrier 22 engages pins 30 at each side of the housing and these pins turn it about pivots 25 to the dumping position of Fig. 3. In this position, the forward edge of the carrier extends through hole 32 and the sweepings are deposited in the waste receptacle 12. On release of the handle 26, the carrier moves downwardly engaging the wall of housing 14 lightly until it reaches stops 34 which then pivot the carrier to the position shown in Fig. 4. The waste can may then be removed to another spot and the operation is repeated until the receptacle 12 becomes filled, at which time it may be removed, dumped and replaced.

To make this device more readily transportable, the base 10, waste receptacle 12, elevator housing 14 including handle 20 and collecting chute 16 are all made of aluminium. In the form illustrated, the base is 11 inches wide and 11¼ inches long, the waste can is 11 inches wide and 8 inches long at the base but 12 inches long at the top. The elevator housing is 24 inches high, 3 inches from front to rear and 11 inches wide. The handle 20 is made of ¾ inch aluminum tubing and the base is made of ⅛″ x ¾″ x ¾″ aluminum angle. These dimensions are not regarded as critical, but they do illustrate one very satisfactory form of the invention.

It will be obvious to those skilled in the art that other guides may be substituted for the posts 28. It will also be obvious that the form of bracket 24 may be appropriately modified. Other similar modifications and changes may be made by those skilled in the art without departing from the scope of this invention.

I claim:

1. A portable and self-contained waste collecting and storing device of a height of about the normal hand level of an adult comprising a base adapted to be placed on a floor, a manually emptiable open-top storage receptacle for dirt and trash mounted at one end of said base, an upwardly inclined chute mounted at the opposite end of said base with its outer end at floor level, and an elevator housing mounted on said base between said chute and said receptacle, said housing being about the height of the normal hand level of an adult and said receptacle being of slightly less height, a vertically reciprocable dirt carried mounted in said housing for movement from a dirt receiving position adjacent said chute to a dirt dumping position adjacent the top of said receptacle, manually operated means operatively associated with said dirt carrier for moving it between its dirt receiving and dirt dumping positions, means at the upper portion of the elevator housing for causing said carrier to dump its contents into said receptacle and means for preventing dumping when the carrier is in all other positions of reciprocation.

2. A portable and self-contained waste collecting and storing device as set forth in claim 1, wherein the manual means for moving said dirt carrier include a bracket pivotally mounting said dirt carrier and an operating handle having one end attached to said bracket and the other end extending upwardly and above the elevator housing when the dirt carrier is in its dirt receiving position, whereby the handle may be grasped and lifted to cause vertical reciprocation of the dirt carrier without forcing an operator to stoop and squat.

3. A portable and self-contained waste collecting and storing device as set forth in claim 1, wherein the manually operated means for moving said dirt carrier includes a bracket pivotally mounting the carrier, the carrier is formed with a generally U-shaped bottom and the pivotal mountings of the carrier are positioned at the respective ends thereof, generally above the bottom of the U, whereby heavy articles of dirt in said carrier will tend to hold it upright and avoid tilting.

4. A portable and self-contained waste collecting and storing device of a height of about the normal hand level of an adult, comprising a flat bottomed base adapted to be placed on a floor, a manually emptiable open-top storage receptacle for dirt and trash removably mounted on one end of said base, an upwardly inclined chute fixedly mounted at the opposite end of said base with its outermost end at floor level, and an enclosed elevator housing mounted on said base between said chute and said receptacle, said housing being about the height of the normal hand level of an adult and being provided with an opening at said chute to permit entry of dirt, a vertically reciprocable generally U-shaped dirt carrier mounted in said housing for movement from a dirt receiving position adjacent said chute and opening to a dirt dumping position adjacent the top of said receptacle, said receptacle being of slightly less height than the elevator housing, and an operating handle extending downwardly through the top of the elevator housing and being connected with a bracket which pivotally mounts the ends of the carrier for moving it between its dirt receiving and dirt dumping positions, cam means at the upper portion of the elevator housing for causing said carrier to dump its contents into said receptacle, guide means for preventing dumping when the carrier is in all other positions of reciprocation, said chute effectively extending slightly inside of said housing and cam means at the bottom of said housing for moving an edge of said carrier under said chute to avoid spilling dirt as it is swept up the chute and into the carrier.

References Cited in the file of this patent

UNITED STATES PATENTS

| | | |
|---|---|---|
| 577,452 | Richardson | Feb. 23, 1897 |
| 735,126 | Menzies | Aug. 4, 1903 |
| 1,007,483 | Peirce | Oct. 31, 1911 |